Patented Dec. 14, 1948

2,456,354

UNITED STATES PATENT OFFICE 2,456,354

COPOLYMERS OF ISO-OLEFINS WITH THIOPHENE SULFONES AND PROCESS FOR MAKING SAME

David W. Young, Roselle, N. J., assignor to Standard Oil Development Company, a corporation of Delaware No Drawing. Application December 2, 1944, Serial No. 566,396

11 Claims. (Cl. 260—92.6)

This invention relates to low-temperature olefinic polymers, relates particularly to polymers of isobutylene with a polyolefin and relates especially to a polymer of isobutylene with an unsaturated sulfone derived from substituted acetylene, by treatment with sulfur dioxide and heating.

It has been found possible in the prior art to interpolymerize isolefins, especially isobutylene, with a considerable group of diolefins, such as butadiene, isoprene, pipyrelene, dimethylbutadiene, dimethallyl, myrcene and the like up to 14 carbon atoms. However, it has been considered that substances containing oxygen or sulfur, if present in more than the most minute traces, were strongly harmful or fatal to the polymerization reaction and accordingly the only polyolefinic copolymerizates which have been used in the past were the polyolefinic hydrocarbons. This opinion was based upon the known violent poisoning effect on the reaction by alcohols, ketones, ethers, esters, mercaptans and the like, all of which, even in traces, greatly reduce the molecular weight of the polymer and in more than small traces, completely prevent the occurence of the reaction. Also these polymers are readily soluble in hydrocarbons before curing, and swell very badly in hydrocarbons after curing.

The details of this reaction are well shown in U. S. Patents Nos. 2,356,127 and 2,356,128 issued August 22, 1944, to Thomas and Sparks.

According to the present invention it is found that a particular group of compounds derived from substituted acetylenes by treatment with sulfur dioxide and a subsequent heat treatment to cyclicize them; these compounds thus containing both oxygen and sulfur in what appears to be a cyclic structure with sulfur as a part of the ring and aliphatic substituents on carbon members in the ring, will interpolymerize with isobutylene at low temperatures under the influence of a Friedel-Crafts catalyst, to yield a solid polymer of relatively very high molecular weight and a linear chain type of construction which contains sufficient unsaturation to be reactive with sulfur or similar curing agents to yield an excellent rubberlike substitute for caoutchouc. The resulting polymer is insoluble in low molecular weight liquid hydrocarbons before curing, although it swells considerably in such hydrocarbons that contain 5 or more carbon atoms per molecule. After curing, the swelling in hydrocarbon solvents is much reduced.

These polymers also are of very great value as raw materials in the preparation of a wide range of other products such as addition agents for oils; as dye intermediates, and the like. Also, the polymer has a marked effect on paraffin wax, yielding a material which in thin films is transparent, and produces a high gloss upon the surface. This is due to the fact that the presence of the sulfur and oxygen in the polymer modifies its reflective constant. By use of refractive index and density it is possible to assign a refractive constant of about 8.7 to the sulfone group.

Thus the process of the invention interpolymerizes isobutylene with a thiophene sulfone such as di-n-propyl thiophene sulfone, also designated as di-n-propylthiophene-1,1-dioxide, which may be regarded as $C_{10}H_{16}SO_2$, at low temperature, to yield a synthetic rubberlike substance preferably containing major proportions of interpolymerized isobutylene with minor proportions of interpolymerized di-n-propyl-thiophene sulfone, with or without other polyolefins. Other objects and details of the invention will be apparent from the following descriptions.

In practicing the invention a mixture is prepared consisting of at least a substantial portion of an isoolefin which is probably isobutylene although for some purposes 2-methyl butene-1 or 2-methyl pentene-1 or 2-methyl hexene-1 may also be used. The isoolefin should be present in the proportion of at least 10% of the olefin mixture and preferably present in major portions, that is, more than 50%. The second component of the reaction mixture is the thiophene sulfone, which may be present in any proportions from 90% to 0.1% of the olefinic mixture, but is preferably present in minor proportions, that is, less than 50%. The superior ranges of proportions are found to be from 90 parts to 99.9 parts of isobutylene with from 10 parts to 0.1 part of the thiophene sulfone.

For the cyclic unsaturated thiophene sulfone, the preferred substance is di-n-propyl-thiophene sulfone which may have any one of three structural formulae:

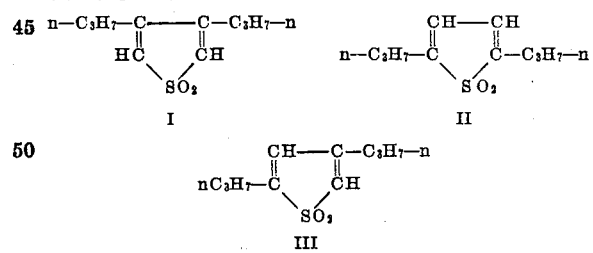

This material is conveniently prepared by the methods shown in the series of articles published in the Journal of the American Chemical Society, volume 61, and earlier issues by C. S. Marvel and W. W. Williams; the 11th of these articles being printed on page 2710 of volume 61, 1939. These articles show that when a substituted acetylene of the type RC≡CH is treated with sulfur dioxide, a chemical combination occurs between the sulfur dioxide and the acetylene and also a polymerization or condensation which results in a compound containing a linear chain with sulfur dioxide and paired carbon atoms united by double bonds. If this material is dissolved in a convenient solvent and heated, a cyclization occurs to yield the compounds indicated by the above formulae. This is a general reaction which is broadly applicable to the substituted acetylenes without regard to the size of the alkyl substituent; compounds containing, as the normal alkyl substituent, carbon atoms from 1 to 6, 8 or 10, are possible. It will be observed from formulae 1, 2 and 3 that this compound contains two double linkages in the ring, and it is the presence of these double linkages which permits of the interpolymerization with isobutylene by the low temperature technique.

It may be noted that this interpolymerization removes from the compound one of the double linkages, but leaves the other double linkage available for curing reactions with sulfur, or para quinone dioxide, or its derivatives, or di-nitroso compounds, or the like. It may be noted that the presence of the $SO_2$ group in the molecule markedly reduces the reactivity of the double linkages so that the compounds, even though they must contain considerable unsaturation, do not react with iodine or bromine, and attempts to obtain iodine numbers yield only zero values. It may be noted that when strong catalysts are used no difficulty is encountered in the interpolymerization, and the material interpolymerizes in a proportion with the isobutylene not far from the proportion in which it is present in the reaction mixture. However, the polymer likewise has a zero iodine number, and the presence of the $SO_2$ group which remains in the finished polymer somewhat reduces the rate of reactivity with elemental sulfur, making necessary the use of powerful sulfurization aids. Also the reduced reactivity of the double linkage greatly increases the resistance to oxygen from atmospheric air, both before and after curing.

This reaction will yield a considerable number of other compounds in addition to the one above indicated; which compounds contain variable numbers of carbon and hydrogen atoms in the substituent. Such compounds as di-n-methyl thiophene sulfone are readily prepared and useful as a copolymerizate in the present reaction. Similarly, such compounds as the di-n-ethyl thiophene-1,1-dioxide; the di-n-butyl thiophene-1,1-dioxide; the di-iso-butyl thiophene-1,1-dioxide; the di-n-pentyl thiophene-1,1-dioxide, and the like, up to substituents having 10 or perhaps more carbon atoms also are readily prepared and are valuable for the present polymerization reaction.

The mixture of mono isoolefin or isobutylene and the thiophene sulfone material is preferably cooled to a temperature ranging from 10° C. down to —103° C., or even lower to —164° C. The cooling may be accomplished by the use of a refrigerating jacket upon the reactor or on a storage tank for the mixed olefins, or may be accomplished by the use of an internal refrigerant. For this purpose such substances as liquid butane, liquid or solid carbon dioxide, liquid ethane, liquid ethylene or even liquid methane are suitable.

The polymerization is conducted by the application to the cold mixed olefinic material of a Friedel-Crafts catalyst selected from the list given by N. O. Calloway in his article on "The Friedel-Crafts synthesis" printed in the issue of "Chemical Reviews" published for the American Chemical Society at Baltimore in 1935 in volume XVII, No. 3, the article beginning on page 327, the list being particularly well shown on page 375. Of the catalysts listed by Calloway, aluminum chloride in solution in a low-freezing, non-complex forming solvent, that is, a solvent which forms no complex with the Friedel-Crafts catalyst and is fluid below —0° C. or fluid at the reaction temperature, is preferred. With some of the olefinic mixtures, gaseous boron trifluoride may be used and with others, liquid titanium tetrachloride may be used. However, all of the active metal halide Friedel-Crafts catalysts are preferably used in solution as above described.

For the catalyst solvent, any carbonaceous compound which is free from oxygen and liquid at temperatures below 0° C. may be used, depending upon the solubility of the metal halide catalyst compound in the selected solvent. With an aluminum chloride type of catalyst the preferred solvents are ethyl or methyl chloride or carbon disulfide. With boron trifluoride, the preferred solvents are ethyl or methyl chloride or carbon disulfide or liquid butane, liquid propane, liquid ethylene, or the like. Aluminum bromide is conveniently usable with hydrocarbon solvents such as liquid propane, liquid ethane, liquid butane, liquid pentane, liquid hexane and the like. Also double salts or complexes of aluminum chloride and aluminum bromide are soluble in these hydrocarbons and are particularly useful.

The polymerization is conveniently conducted by spraying the liquid catalyst or catalyst solution through a nebulizer or spraying nozzle onto the surface of the rapidly stirred cold olefinic material. The reaction, especially with the more active catalysts, proceeds promptly to yield the desired polymer.

The resulting polymer is a copolymer of the isoolefin with the thiophene sulfone. The molecular weight may lie between about 10,000 and about 100,000 depending upon the catalyst chosen, the temperature of polymerization, the particular thiophene sulfone chosen and other variables. It is of interest to note, however, that, as above pointed out, the material is nonreactive with bromine or iodine and shows an iodine number of zero. It may be further noted that the material is reactive with chlorine in the normal chlorination reaction of isobutylene-containing polymers; it being quite possible to introduce considerable chlorine into the polymer molecule by dissolving the polymer in a chlorine-resistant solvent such as carbon tetra chloride and passing in elemental chlorine, especially at elevated temperatures, and in the presence of ultra violet light. It may be noted that this non-reactivity applies in part also to oxygen, but only slightly to sulfur. The sulfurization reaction occurs readily, especially at relatively high curing temperatures, and in the presence of the more potent sulfurization aids, such as TUADS (tetramethyl thiurane disulfide), CAPTAX (benzo-thiogole), and the like.

The polymer is plastic, with a substantial amount of cold flow and a softening point at about 180° C. and while it does not melt at elevated temperatures, it becomes much softer and is sufficiently plastic to be milled, moulded or otherwise processed. The polymer is reactive with sulfur in a curing reaction, especially in the presence of a sulfurization aid such as TUADS (tetra methyl thiuram disulfide); and with such curing agents as para-quinone dioxime and its homologues; and the nitroso compounds generally. After cooling, the material shows a substantial strength ranging from 100 to 3500 lbs. per square inch depending to some extent upon the molecular weight and upon the particular thiophene sulfone chosen. It likewise shows an elongation at break ranging from 300% to 1200%. It shows an excellent flexure resistance, an excellent abrasion resistance and a phenomenally high resistance to ozone and oxidizing agents generally. It is wholly insoluble at room temperature in the oxygenated solvents including water, aqueous acid, alkalin or salt solutions, all the low molecular weight alcohols, all the low molecular weight ketones, all the low molecular weight ethers, all of the esters and all of the low molecular weight organic acids. The polymer both in the uncured and cured form is insoluble in hydrocarbons and halogenated hydrocarbons, but it is swellable in them, although less so than the ordinary types of polymers.

For the compounding and curing process, a convenient compounding recipe is:

| | Parts by weight |
|---|---|
| Polymer | 100 |
| Zinc oxide | 0.5 to 10 |
| Stearic acid | 0.5 to 7 |
| Carbon black | 10 to 200 |
| Sulfur | 2 to 4 |
| TUADS (tetra methyl thiuram disulfide) | 1 to 4 |

The TUADS and sulfur may be replaced by paraquinone dioxime or other dioxime substances in the proportion of approximately 2 to 4 parts, or by a dinitroso compound in the proportion of from 1 to 4 or 5 parts; or mixtures of the various curing substances may be used.

The compound is conveniently prepared on the roll mill, and the completed compound may be placed in molds and cured at temperatures ranging from 260° F. to 350° F. for time intervals ranging from a few minutes to 5 or 6 hours, depending upon the nature and amount of the curing component and the temperature.

The resulting cured polymer will show a tensile strength within the range between 300 lbs. and 3500 lbs. per square inch, with an elongation at break ranging from 250% to 1200%, and a modulus (pounds pull to produce an elongation of 300%) ranging from 50 to 500. The polymer also shows complete chemical saturation after curing, shows a high resistance to oxidation by air and ozone, shows a very high abrasion resistance, a very high flexure resistance and other very valuable physical properties which make it a superior replacement for natural rubber.

Example I

A mixture was prepared consisting of 985 parts by weight of 96% pure isobutylene with 15 parts by weight of di-n-propyl-thiophene sulfone ($C_{10}H_{16}SO_2$) and cooled with approximately an equal weight of pulverized solid $CO_2$, the temperature obtained being approximately −78° C. To the cold mixture there were then added 200 parts by weight of methyl chloride. The isobutylene and di-n-propyl thiophene sulfone were mutually only slightly soluble but the methyl chloride acted as a mutual solvent to bring the several substances into a homogenous solution. To this solution at −78° C. there were added approximately 450 parts of a solution of aluminum bromo chloride, $Al_2Br_5Cl$, in solution in liquid butane in a concentration of 0.84 grams per 100 grams of solution. The catalyst was well stirred in and after a few minutes the polymerization reaction began, this amount of catalyst being sufficient to polymerize approximately 43% of the olefinic material in approximately 15 minutes. The solid polymer was removed and brought up to room temperature.

The insolubility of the polymer made impossible a determination of the apparent molecular weight by the Staudinger method. However, the properties of the uncured polymer in comparison to the properties of the older types of polymers suggested the probability that the molecular weight was in the neighborhood of 40,000 to 45,000.

The polymer was then worked on the mill until well warmed up and was then compounded according to the following recipe.

| | Parts by weight |
|---|---|
| Polymer | 100 |
| Zinc oxide | 5 |
| Stearic acid | 3 |
| Carbon Black | 50 |
| Sulfur | 3 |
| TUADS (tetra methyl thiuram disulfide) | 1 |

After compounding according to the above recipe, samples were placed in molds and cured at 307° F. for 40, 60 and 120 minutes. Thereafter test specimens were cut from the cured polymer and determinations made of tensile strength and elongation at break to yield the following inspection record:

| Cure Time | Cure Temp. | Tensile, lbs. per sq. inch | Elong. per cent at Break | Modulus at 300% |
|---|---|---|---|---|
| | °F. | | | |
| 40 min | 307 | 938 | 1,100 | 260 |
| 60 min | 307 | 1,440 | 1,040 | 395 |
| 120 min | 307 | 1,625 | 910 | 440 |

These results show that the polymer, while slightly slow in curing, yields an excellent material of good tensile strength and adequate elongation.

Example 2

A mixture was prepared consisting of approximately 98 parts by weight of 98% pure isobutylene with 2 parts by weight of di-n-butyl thiophene sulfone and cooled with about 300 parts by weight of liquid ethylene, the temperature obtained being approximately −97 to −101° C. To this cold mixture there was then added approximately 20 parts by weight of methyl chloride to obtain a complete solution of the respective substances. To this cold solution there were then added approximately 450 parts of a solution of aluminum chloride in methyl chloride; the solution containing approximately 0.5 grams of $AlCl_3$ per 100 of solution. The catalyst was applied in the form of a fine spray to the surface of the rapidly stirred olefinic mixture. The reaction proceeded until approximately three quarters of the olefinic material present was polymerized.

The polymer was then washed on the mill, compounded as in Example 1, and tensile strength, elongation and modulus determinations were made, as in Example 1, the resulting values being approximately the same.

Example 3

Another polymer was prepared, as in Example 2, using di-n-ethyl thiophene sulfone to yield a similar polymer which was similarly processed and found to have practically the same properties.

Thus the process of the invention interpolymerizes an isoolefin such as isobutylene with a thiophene sulfone to yield a new polymer capable of being cured, which contains substantial quantities of oxygen, nitrogen and original sulfur to yield a product which is an excellent replacement for rubber generally. The new polymer may also be compounded with Butyl rubber, polyisobutylene, polyethylene, and other synthetic hydrocarbon resins to formulate a number of modified products.

While there are above disclosed but a limited number of embodiments of the process and product of the invention, it is possible to provide still other embodiments without departing from the inventive conception herein disclosed.

The invention claimed is:

1. A polymerization process comprising the steps of mixing together a major proportion of isobutlyene with a minor proportion of a dialkyl thiophene-1,1-dioxide having 1–10 carbon atoms per alkyl group at a temperature within the range between 0° C. and −164° C. and copolymerizing the two substances together by the application thereto of a Friedel-Crafts catalyst.

2. A polymerization process comprising the steps of mixing together 90 to 99.9 parts of isobutylene with 10 to 0.1 parts of a di-n-alkyl thiophene-1,1-dioxide having 1 to 5 carbon atoms per alkyl group at a temperature within range between 0° C. and −164° C. in the presence of methyl chloride, and copolymerizing the two substances together by the application thereto of a Friedel-Crafts catalyst.

3. A polymerization process comprising the steps of mixing together at least 50 to 99.9 parts of isobutylene with 50 to 0.1 parts of di-n-propyl thiophene-1,1-dioxide at a temperature within the range between 10° C. and −164° C. and copolymerizing the two substances together by the application thereto of a Friedel-Crafts catalyst.

4. A polymerization process comprising the steps of mixing together a major proportion of isobutylene with a minor proportion of di-n-butyl thiophene-1,1-dioxide at a temperature within the range between 10° C. and −164° C. and copolymerizing the two substances together by the application thereto of a Friedel-Crafts catalyst.

5. A polymerization process comprising the steps of mixing together a major proportion of isobutylene with a minor proportin of di-n-ethyl thiophene-1,1-dioxide at a temperature within the range between 10° C. and −164° C. and copolymerizing the two substances together by the application thereto of a Friedel-Crafts catalyst.

6. A copolymer of 10 to 99.9% of an iso-olefin having from 4 to 7 carbon atoms and 90 to 0.1% of a dialkyl thiophene-1,1-dioxide having up to 10 carbon atoms per alkyl group.

7. A sulfur-curable copolymer of a major proportion of isobutylene and a minor proportion of a dialkyl thiphene-1,1-dioxide having up to 10 carbon atoms per alkyl group.

8. An interpolymer of 90 to 99.9% of isobutylene and 10 to 0.1% of a di-n-alkyl thiophene-1,1-dioxide having alkyl groups of 1 to 10 carbon atoms.

9. An interpolymer of a major proportion of isobutylene and a minor proportion of di-n-propyl thiophene-1,1-dioxide.

10. An interpolymer of a major proportion of isobutylene and a minor proportion of di-n-butyl thiophene-1,1-dioxide.

11. An interpolymer of a major proportion of isobutylene and a minor proportion of di-n-ethyl thiophene-1,1-dioxide.

DAVID W. YOUNG.

REFERENCES CITED

The following references are of record in the file of this patent:

UNITED STATES PATENTS

| Number | Name | Date |
|---|---|---|
| 2,394,776 | Hoffman | Feb. 12, 1946 |